CAPACITY ENCODER

Filed Nov. 15, 1963 5 Sheets-Sheet 1

INVENTORS
NORMAN J. BOSE
GEORGE N. MALINA
BY

ATTORNEY

CAPACITY ENCODER

Filed Nov. 15, 1963 5 Sheets-Sheet 4

FIG. 8.
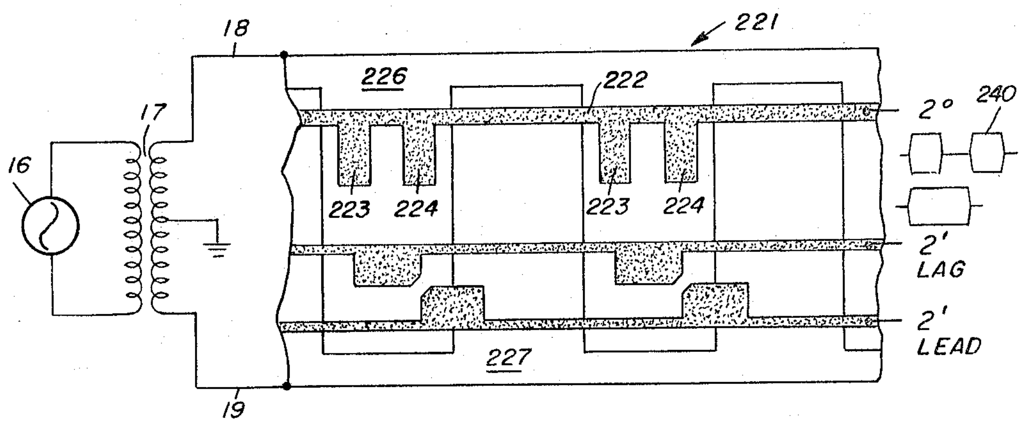
FIG. 10.
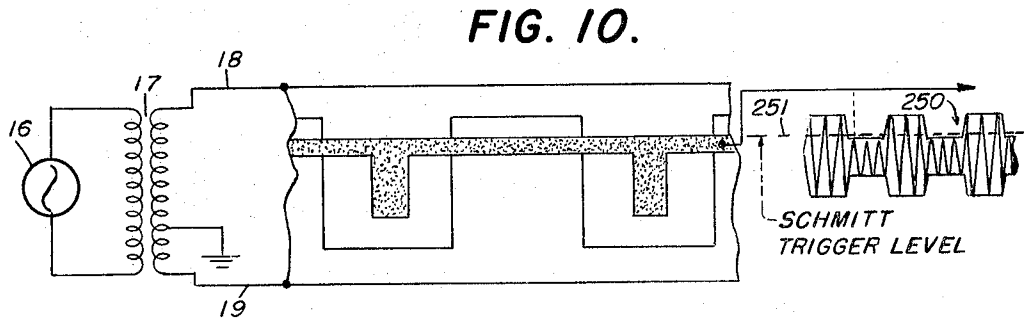
FIG. 9.
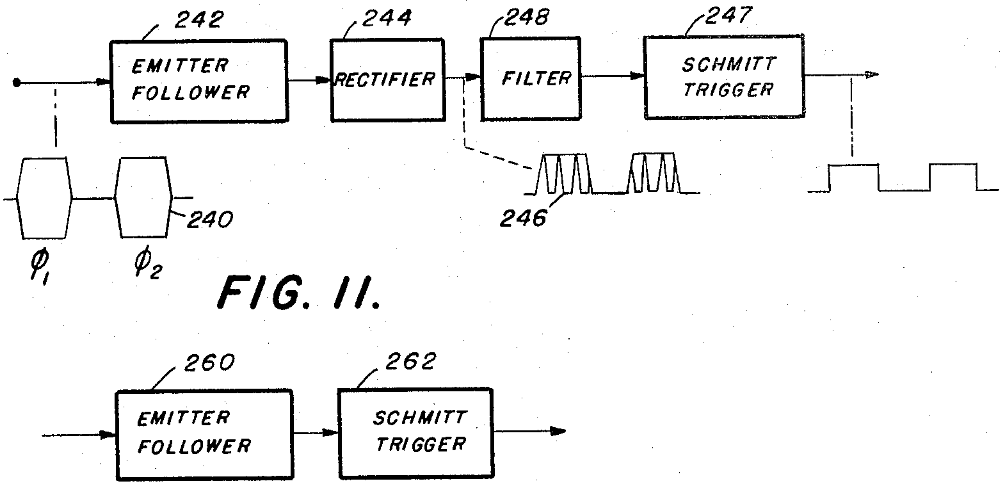
FIG. 9, FIG. 11.

3,286,252

CAPACITY ENCODER

Norman J. Bose, North Hollywood, and George N. Malina, Montrose, Calif., assignors to General Precision, Inc., a corporation of Delaware Filed Nov. 15, 1963, Ser. No. 323,959
23 Claims. (Cl. 340—347)

This invention relates to novel analog-to-digital encoders and more particularly to a new and improved analog-to-digital encoder that employs means of detecting electrostatic field variations by electrostatic induction between an information member and readout elements.

Analog-to-digital encoders are used as a means of converting analog quantities in the form of angular shaft positions to digital representation. Digital representation may be defined as an output signal which is a series of discrete voltages in a coded form. In most cases the binary code is used.

There are, in the prior art, at least two basic types of analog-to-digital encoders. One type is known in the art as the brush contact type and the other is the noncontact type encoder. The first type, the brush contact encoder, consists of a rotating input shaft, which rotates in an amount proportional to an analog quantity, coupled to an information member in the form of a code disk. The code disk has a plurality of concentric circular tracks on one surface. Each of these tracks comprises a plurality of alternate conductive and nonconductive segments. Each track represents a digit of a binary number with the outer track used to represent the least significant digit of the binary number and the inner track the most significant digit. Each of the conductive segments is connected to a source of electrical voltage. In one embodiment a single brush makes electrical contact with a particular track as the disk rotates. The brush establishes electrical continuity when contacting a conductive segment. Thus, when an electrical circuit is complete; that is, a brush is contacting a conductive segment, a binary 1 is represented, and when the circuit is open; that is, the brushes contact a nonconductive segment, a binary 0 is represented. Embodiments have been designed using multiple brushes on particular tracks.

The problems encountered in brush contact encoders are wear and excessive noise. It is obvious that when two objects such as a segment of a code disk and a brush make continuous contact, both the segments and the brushes will tend to wear with use, thus giving the encoder a limited life. Spurious noise is generated generally in the form of signals of relatively short duration in an electrical waveform, and is caused by momentary interruption of electrical contact between the brush and the code disk segment. These spurious signals are undesirable in an output waveform and can cause erroneous output readings.

Prior art noncontact encoders have generally operated on magnetic principles. These encoders are similar to brush contact encoders except that the electrical brush is replaced by sensing or readout elements which do not require contact with the information member or code disk. One such encoder uses magnetic read heads which detect changes in magnetic flux produced by varying the amount of relatively low reluctance material in a magnetic circuit. Such encoders generally employ raised and recessed segments which rotate with respect to the readout element, providing decreased reluctance when the readout element is adjacent a raised segment on a disk, representing a binary 1, and an increased reluctance when the readout element is adjacent a recessed segment to represent a binary 0.

Noncontact encoders have a definite advantage over the brush contact type with their relative low signal-to-noise ratio. Because of their contactless operation there is no spurious noise generated due to the momentary interruption of electrical contact between code segments and brushes, as in brush contact encoders. Also due to the fact that there is no wear on the code disk segments, the life of the encoder is greatly extended.

A serious disadvantage of magnetic encoders is the deterioration in readout signals in relatively high temperature environments. As the temperature of the environment increases, the output signals diminish until the Curie point of the material composing the code disk is reached, at which time the code disk will no longer sustain a magnetic field, thus producing little or no output signal. Hence, the encoder is no longer responsive to the position of its shaft.

Another disadvantage of magnetic encoders is that they are quite expensive to manufacture, particularly because machining of the raised and recessed portions of the code disk is a costly operation. Encoders of this type also require a considerable amount of associated circuitry, particularly for generating the magnetic field and for detecting changes in reluctance.

Briefly described, the present invention is an analog-to-digital encoder that detects electrostatic field variations on an information code disk by electrostatic induction. A code disk is provided with a plurality of concentric tracks, each track containing a plurality of code segments wherein the outermost track generally represents the least significant digit with the significance of the tracks progressing inwardly until the innermost track represents the most significant digit. Adjacent segments on a concentric track represent binary 1 and binary 0, respectively. Each segment is composed of conductive material and is insulated from adjacent segments. A voltage is supplied of a relatively high carrier frequency and applied to alternate segments at a particular phase and at the opposite phase (180 degrees phase difference).

The carrier frequency is transmitted from the information code disk to pickoff elements by electrostatic induction. Each track of the information code disk is provided with pickoff elements which are separated from the track by an air gap. Thus each pickoff element receives a signal from its respective track.

Since adjacent segments on the code disk have opposite phases applied thereto, the electrostatic field therebetween diminishes to a zero potential level at a crossover point between the segments. As a pickoff element moves relative to the segments on each track, a voltage at the carrier frequency is transmitted to the pickoff element. While the pickoff element is capacitively coupled to a segment, that is, the element is adjacent to the segment, the phase exciting the segment will be transmitted to the element. As a pickoff element approaches the zero crossover between the segments, the amplitude of the carrier frequency transmitted to the pickoff element diminishes until, at the zero crossover point, no signal is transmitted to the pickoff element.

Further movement of the code disk relative to the pickoff element results in transmission of voltages of opposite phase to the pickoff element. The signal increases as the movement continues until maximum amplitude is obtained when the pickoff element is directly adjacent the segment.

The output signals from any track produced by the relative motion of the pickoff element and the code segment are thus a series of envelopes modulating the carrier frequency. Each envelope has a length proportional to the length of the code disk segment and to the speed of relative motion.

Each output signal presents an opposite phase of the carrier frequency in alternate envelopes representing binary 1 and binary 0, respectively.

Electronic circuitry is provided to interrogate outputs from the pickoff elements. If interrogation of a pickoff element reveals a carrier frequency of one specific phase, a binary 1 is generated in the form of a pulse. If, on the other hand, the opposite phase of the carrier frequency is present, then a binary 0 is presented by no pulse or a negative pulse.

One object of this invention is to provide a novel and improved analog-to-digital encoder which provides a relatively low signal-to-noise ratio of its output signals.

Another object of this invention is to provide a novel and improved noncontact analog-to-digital encoder.

Another object of this invention is to provide a novel and improved noncontact analog-to-digital encoder which is relatively simple and inexpensive to manufacture.

Another object of this invention is to provide a novel and improved analog-to-digital encoder employing electrostatic induction as means for detecting electrostatic field variations.

Another object of this invention is to provide a reliable, novel and improved contactless encoder which is relatively unaffected by high temperature environment.

Another object of this invention is to provide a novel and improved analog-to-digital encoder which is insensitive to electrostatic fields generated by outside sources.

Another object of this invention is to provide a novel and improved analog-to-digital encoder that uses alternating currents of high frequency to improve electrostatic induction between the information segment and the pickoff element.

Another object of this invention is to provide a novel and improved analog-to-digital encoder wherein independent signals are provided for binary 1 and for binary 0.

Other objects featured in this invention become fully apparent as the disclosure proceeds in the following detailed description of the preferred embodiment of this invention, as illustrated in the drawings in which:

FIGURE 8 is a partial view, shown in linear form, of a portion of an embodiment of the present invention using one siginficant code track to provide two outputs of different significance;

FIGURE 9 is a block diagram of output circuitry suitable for use with the embodiment of FIGURE 8;

FIGURE 10 is a partial view, shown in linear form, illustrating a portion of an alternative embodiment of the present invention;

FIGURE 11 is a block diagram of output circuitry suitable for use with the embodiment of FIGURE 9.

Figure 1:
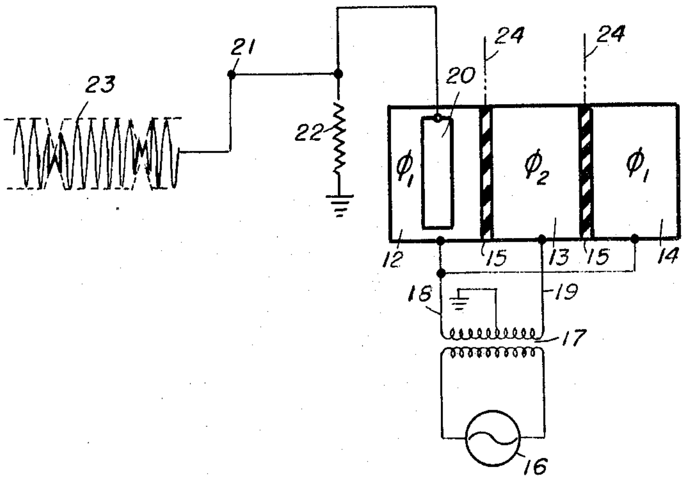
FIGURE 1 is a schematic illustration of a portion of this invention simplified for the purpose of explanation.

Turning now to a more detailed description of this invention where like reference numerals indicate like or corresponding parts throughout the several views in the drawings, and referring to the embodiment illustrated in FIGURE 1, the present invention can best be explained by considering a portion of a device comprising three segments on one track.

A pair of similar electrically conductive code segments 12 and 14 are separated by a third electrically conductive segment 13. The segments 12, 13 and 14 are generally composed of a metallic material, such as copper, silver, gold, or the like, because of their qualities as good electrical conductors. The segments 12 and 13 are insulated from each other by one insulator 15 and segments 13 and 14 are insulated from each other by a second insulator 15. An oscillator 16 generates an electrical signal which may have a carrier frequency of 600 kilocycles and applies said frequency to a transformer 17 which has an output coil having its center tap connected to ground. One end of the output coil of the transformer 17 is connected to the segments 12 and 14 by a conductor 18. The opposite end of the output coil is connected to the segment 13 by a conductor 19, providing the electrical signal at a particular phase to the segments 12 and 14 and at opposite phase (180 degree phase difference) to the segment 13. Hereinafter, the output appearing at conductor 18 will be denoted $\phi_1$ and the output appearing at conductor 19 will be denoted $\phi_2$. Thus the transformer 17 applies a voltage to segments 12 and 14 at $\phi_1$ and a voltage to segment 13 at $\phi_2$.

A pickoff element 20 is shown positioned directly over the segment 12 and electrostatically coupled thereto. Connected to the pickoff element 20 is an output terminal 21 which is connected to ground through a resistor 22.

It is evident that the use of a relatively high carrier frequency and the maintenance of a relatively small separation between the pickoff element 20 and the segment 12 will result in the appearance of a significant signal at the pickoff element 20.

The signals applied to adjacent segments, such as segments 12 and 13, cause an electrostatic field to surround the segments. Since opposite phases of the electrical signal have been applied to segments 12 and 13, when a negative voltage exists on segment 12, a positive voltage will exist on segment 13. Because of the application of opposite phases, a fixed zero potential level will exist between adjacent segments. This zero level is shown at line 24. Similarly there will be found a fixed zero level between the segments 13 and 14. It may be understood that the zero level shown at the lines 24 remains relatively fixed during all portions of the cycle of the carrier frequency.

When the pickoff element 20 is positioned adjacent the segment 12, an induced signal appears across the resistor 22 at $\phi_1$ and at maximum amplitude.

As the pickoff element 20 moves toward segment 13, and particularly as the pickoff element 20 moves toward the fixed zero line 24 between segments 12 and 13, the amplitude of the output signal appearing at terminal 21 starts to decline toward the fixed zero level since the induced electrostatic field contributed by the segment 12 at $\phi_1$ will be added algebraically to the induced electrostatic field contributed by the segment 13 at $\phi_2$. When the pickoff element 20 is positioned directly across the zero line 24 the output signal will be minimum.

When relative motion is continued toward segment 13, the output signal will increase to maximum amplitude at $\phi_2$, as may be understood from the above description. Thus, relative motion between the pickoff element 20 and the segments 12, 13 and 14 produces a modulated carrier frequency, as illustrated in graph 23. In graph 23 the flat portion of the envelopes will be proportional to the length of a segment 12, 13 or 14 and to the speed of relative motion between the pickoff element 20 and the segments. Each envelope contains a signal which is 180 degrees out of phase with the signal in adjacent envelopes.

Figure 2:
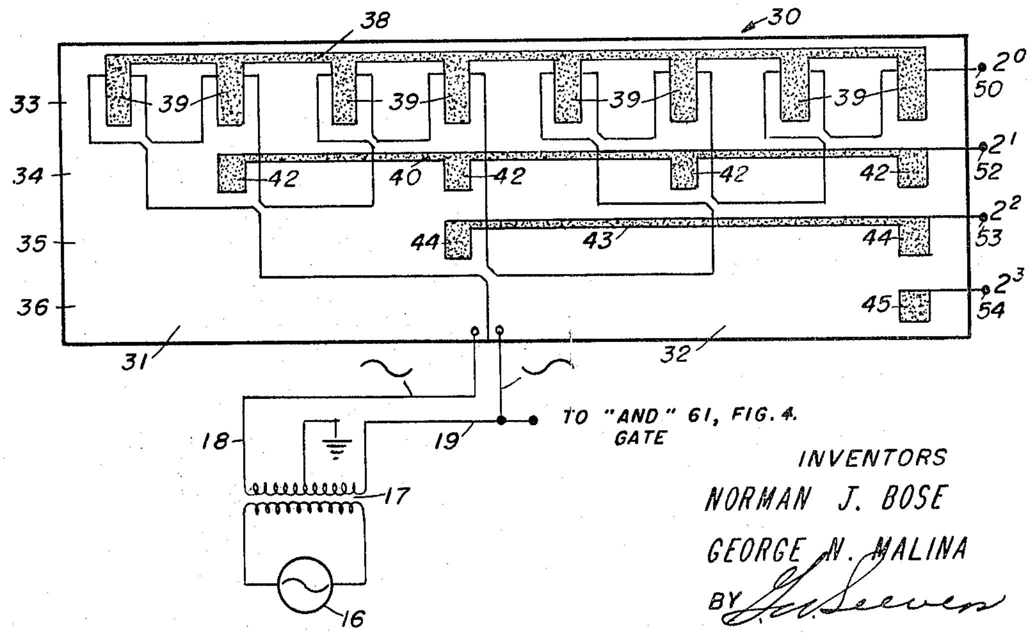
FIGURE 2 is a schematic illustration of an analog-to-digital encoder shown in linear form and employing the principles of this invention.

This basic principle of operation, explained and illustrated in FIGURE 1, is applied to an analog-to-digital encoder shown in FIGURE 2. FIGURE 2 illustrates an information code member 30, shown in linear form, which is composed of a nonconductive material having two distinct electrically conductive patterns each insulated from the other. A first pattern 31 receives the carrier frequency at $\phi_1$ and a second pattern 32 receives the carrier frequency at $\phi_2$. The code member 30 comprises a plurality of tracks each representing a binary digit. Track 33 has a binary significance of $2^0$ and represents the least significant digit. Track 34 has a binary significance of $2^1$ and represents the next significant digit. Track 35 has a binary significance of $2^2$ and represents the next significant digit and the last track 36 has a binary significance of $2^3$ and represents the most significant digit. Code member 30, as shown in FIGURE 2, thus comprises four binary bits providing a total of sixteen digital indications. The first track 33 consists of a plurality of sixteen segments of equal size, wherein there are eight segments forming a portion of pattern 31, and eight segments spaced between the segments of pattern 31, forming a portion of the pattern 32. The next significant track 34 is divided into eight equal segments, wherein alternate segments further form the pattern 31 and the remaining segments further form the pattern 32. Track 35 is divided into four segments of equal size alternately forming portions of the patterns 31 and 32. The most significant digit track 36 is divided into two segments; one segment forms part of the pattern 31 and the other segment forms part of the pattern 32.

The least significant digit track 33 is associated with a pickoff element 38, which comprises eight pickoff segments 39. As the pickoff element 38 moves with respect to the track 33, all pickoff segments 39 of pickoff element 38 are positioned over all code segments in track 33 excited by the same phase. In FIGURE 2 the pickoff segments 39 are shown positioned over code segments excited by the carrier frequency $\phi_2$. Track 34 is associated with a pickoff element 40, which comprises four pickoff segments 42. As the pickoff element 38 moves with respect to the track 33, all pickoff segments 42 of the pickoff element 40 are positioned over all code segments in track 34 excited by the same phase. Track 35 is associated with a pickoff element 43 which is comprised of two pickoff segments 44. As the pickoff element 38 moves with respect to the track 33, both segments 44 of pickoff element 43 are positioned over both code segments excited by the same phase. The most significant digit 36 consists of one pickoff element 45. The specific relationship of pickoff element spacing to code segment spacing insures that all pickoff elements in each track assume the same relative position with respect to all code segments in their particular track and that the signals transferred to each pickoff segment of a particular track will be of the same phase. Only one pickoff segment per track is necessary for operation of the device, but it is evident to those skilled in the art that the use of a plurality of pickoff segments increases the total code segment area and total pickoff segment area thereby increasing the total electrostatic induction and thus providing output signals of greater amplitudes.

Figure 3:
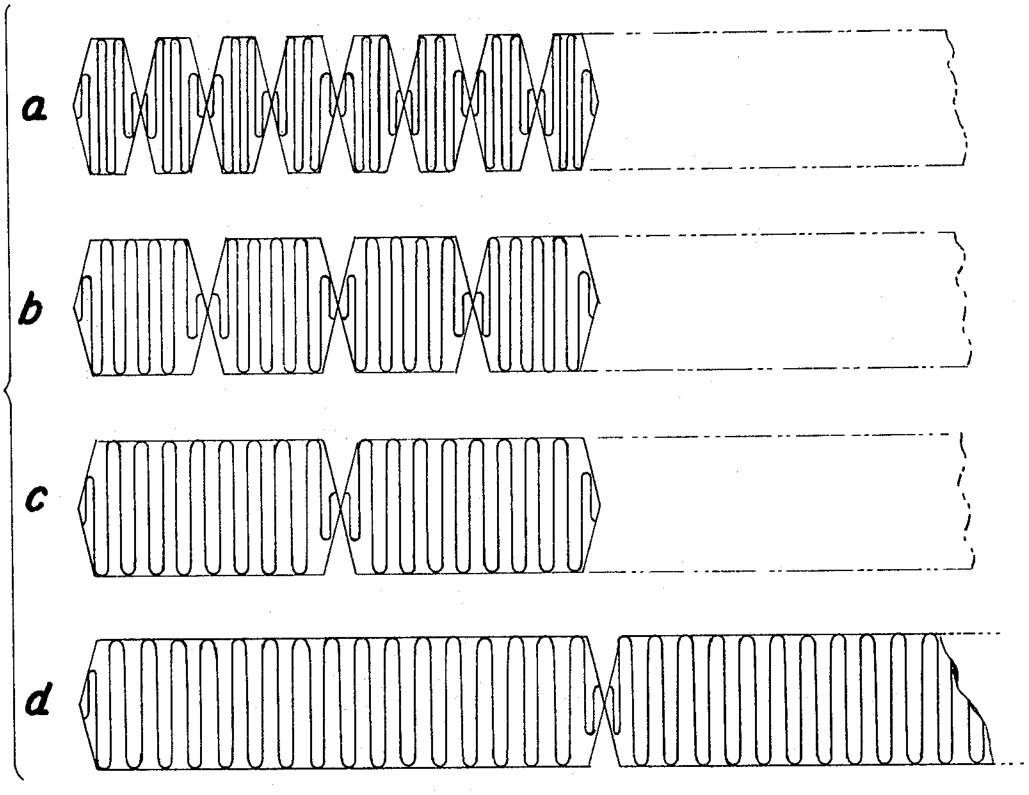
FIGURE 3 is a series of graphs of modulated waveforms constituting examples of outputs generated by the analog-to-digital encoder of FIGURE 2.

The pickoff elements 38, 40, 43 and 45 are electrically coupled to the output lines 50, 52, 53 and 54, respectively. The signals appearing at these output lines are shown in FIGURE 3. Each signal consists of a series of envelopes modulating the carrier frequency. As may be seen, adjacent envelopes contain the frequency at opposite phases. As previously mentioned each envelope has a length proportional to the length of the code disk segments and to the speed of relative motion between the pickoff elements and the code track 30. Graph B of FIGURE 3 contains envelopes having twice the length of the envelopes shown in Graph A; Graph C envelopes are twice the length of the envelopes shown in Graph B, and Graph D envelopes are twice the length of envelopes shown in Graph C, each graph representing digital representations of twice the significance of the previous graphs.

Circuits that are shown in the drawings and referred to in the following descriptions are all well known to those skilled in the art. For additional information and description of these circuits the following references will be helpful. AND/OR gates and the inverter can be found in the book "Digital Computer Fundamentals" by Thomas C. Bartee published by the McGraw-Hill Publishing Company. Specifically, the AND gates can be located on page 65, the OR gate on page 73, and the inverter on page 79. The rectifier and filter can be found in the book "Basic Electronics" by Bernard Grob and also published by the McGraw-Hill Publishing Company. Specifically, the filter and the rectifier can be found on pages 388 and 408, respectively. The Schmitt trigger can be found in the U.S. Army Technical Manual TM 11–690 Basic Theory and Application of Transistors on page 208.

Figure 4:
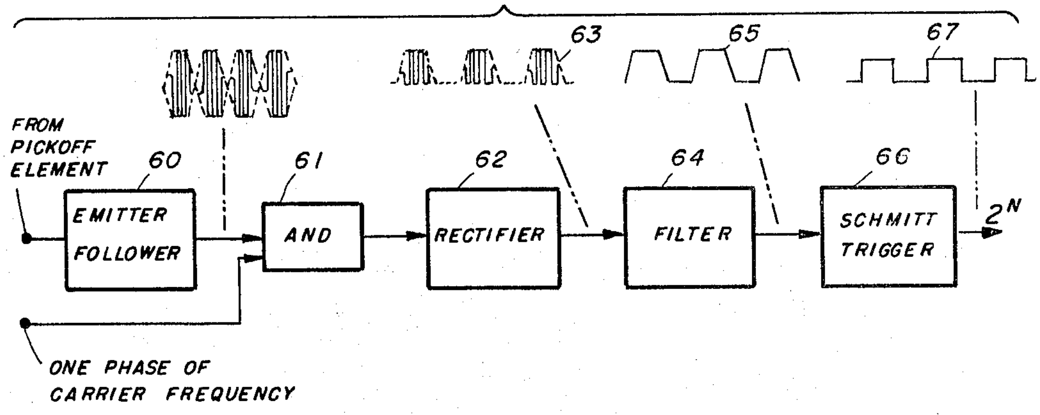
FIGURE 4 is a block diagram illustrating the transformation of the waveforms of FIGURE 3 into relatively square digital pulses.
Figures 5, 6:
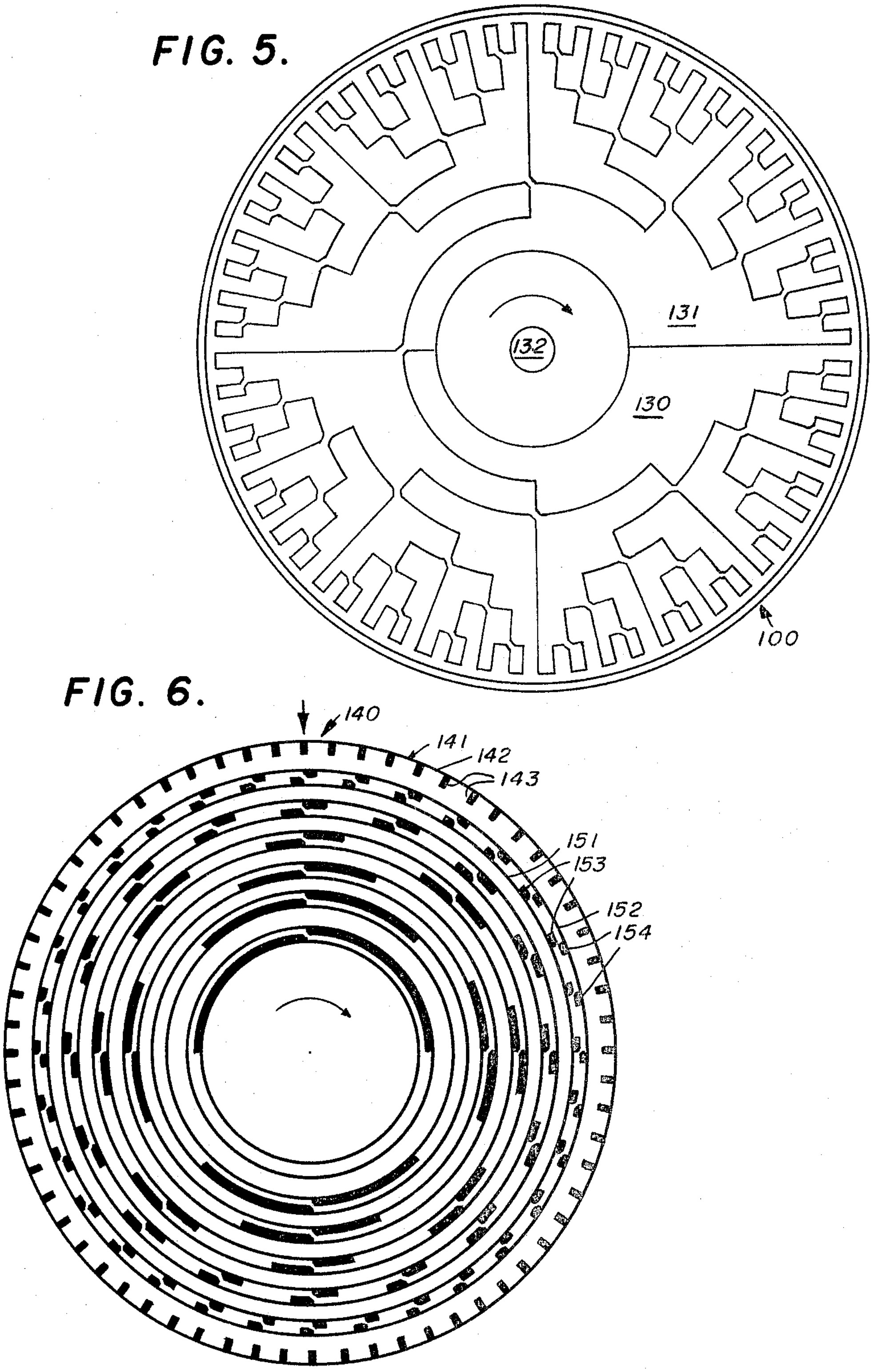
FIGURE 5 is an illustration of an information code disk forming a portion of a seven bit analog-to-digital encoder.
FIGURE 6 is an illustration of a pickoff disk forming a portion of the seven bit analog-to-digital encoder.

These envelopes as depicted in FIGURE 3 can be converted to signals indicating binary 1's for an envelope containing one phase and a binary 0 for an envelope containing the second phase. The block diagram of FIGURE 4 illustrates the details of one such method of a conversion. The signals from the line 50 of FIGURE 2, that is, the signal representing the least significant digit, illustrated by Graph A of FIGURE 3, is transmitted to the emitter follower 60 which is required for impedance matching of the circuitry which follows to the high impedance and particularly the high capacitance between the pickoff element and the information member segments. The signal from the emitter follower 60 is then fed into an AND gate 61, which has for its second input one phase of the carrier frequency. In FIGURE 4, $\phi_2$ is used, therefore, the second input to the AND gate 61 is coupled directly from the lead 19 of the transformer 17. The purpose of the AND gate 61 is to allow only positive signals that are in phase with the reference signal $\phi_2$ to pass through the gate. Thus the AND gate 61 effectively eliminates the positive portion of all signals that are not in phase with the reference signal. Envelopes of either phase can be selected by changing the phase of the reference input. The signal is then introduced into a rectifier 62 which removes all negative portions, as shown in the Graph 63. Next the signal is introduced into a low pass filter 64, which removes all of the carrier frequency leaving only the envelope as shown in Graph 65. This signal is squared by a Schmitt trigger 66 as shown in Graph 67, thus producing a signal that is used as a digital representation. The preceding principles of the encoder just described and shown generally in FIGURE 2 can be applied to a more optimum seven bit analog-to-digital encoder using standard V scan circuitry for anti-ambiguity, as shown in FIGURES 5 and 6. Standard V scan output for an analog-to-digital encoder can be found by referring to Patent Number 3,056,956 issued to Leo P. Retzinger, Jr., on October 2, 1962.

A rotatable code disk 100 is constructed of a nonconductive material and has a pair of electrical conductive patterns 130 and 131 placed thereon by standard plating and etching methods. Code disk 100 receives its analog inputs by rotation of a shaft 132. The electrically conductive patterns 130 and 131 are constructed according to the same principles as the code patterns 31 and 32 previously described in connection with FIGURE 1.

Each pattern 130 and 131 has a voltage applied at the carrier frequency at a different phase. This frequency is generally applied to the disk 100 by brushes and slip rings on the shaft 132, not shown, or may be applied by electrostatic induction by placing a pair of conductive tracks on the back of the code disk 100. One track receives a signal $\phi_1$ and the other track receives a signal $\phi_2$, transferring these signals to the patterns 130 and 132 through the disc 100.

The information from code disk 100 is electrostatically transferred to the pickoff disk 140. Therefore, the pickoff disk 140 is placed with the segment in close relation with the segment on code disk 100. The pickoff disk 140 does not physically contact the segments of the code disk 100.

Pickoff elements are located on the pickoff disk 140 which consists of a plurality of concentric tracks. A pickoff track 141 is used for the least significant digit and consists of a pickoff element 142, which has a plurality of pickoff segments 143 which are spaced as previously described in connection with FIGURE 2. The pickoff segments in this embodiment are half the width of the particular code segments of their particular code tracks on disk 100. The next significant track, as an example of all other more significant tracks, contains two pickoff elements, a leading pickoff element 151 and a lagging pickoff element 152. The leading pickoff element 151 has a plurality of pickoff segments 153 and the lagging pickoff element 152 has a plurality of pickoff segments 154. The pickoff elements are denoted "leading" and "lagging" by their position as the binary count increases. Because FIGURE 6 is a view of the pickoff disk 140 that normally faces the segments of the code disk 100, the leading and lagging segments appear opposite the code disk. But when the pickoff disk 140 is turned over with its pickoff segments covering their respective code tracks, the leading and lagging tracks assume the correct position. Leading pickoff segment 153 of the leading pickoff element 151 leads the lagging pickoff segment 154 of the lagging pickoff element 152 by one-half the distance of the code segment 133 of code disk 100. Thus, no matter what angular position the code disk assumes, one of the two pickoff elements, 151 or 153, is always directly over a segment and never over a transition line. Positioning of the pickoff segments assures that the previous digit is at a particular phase when a leading pickoff element of the next significant digit is interrogated and at an opposite phase when a lagging pickoff element of the next significant digit is interrogated.

Figure 7:
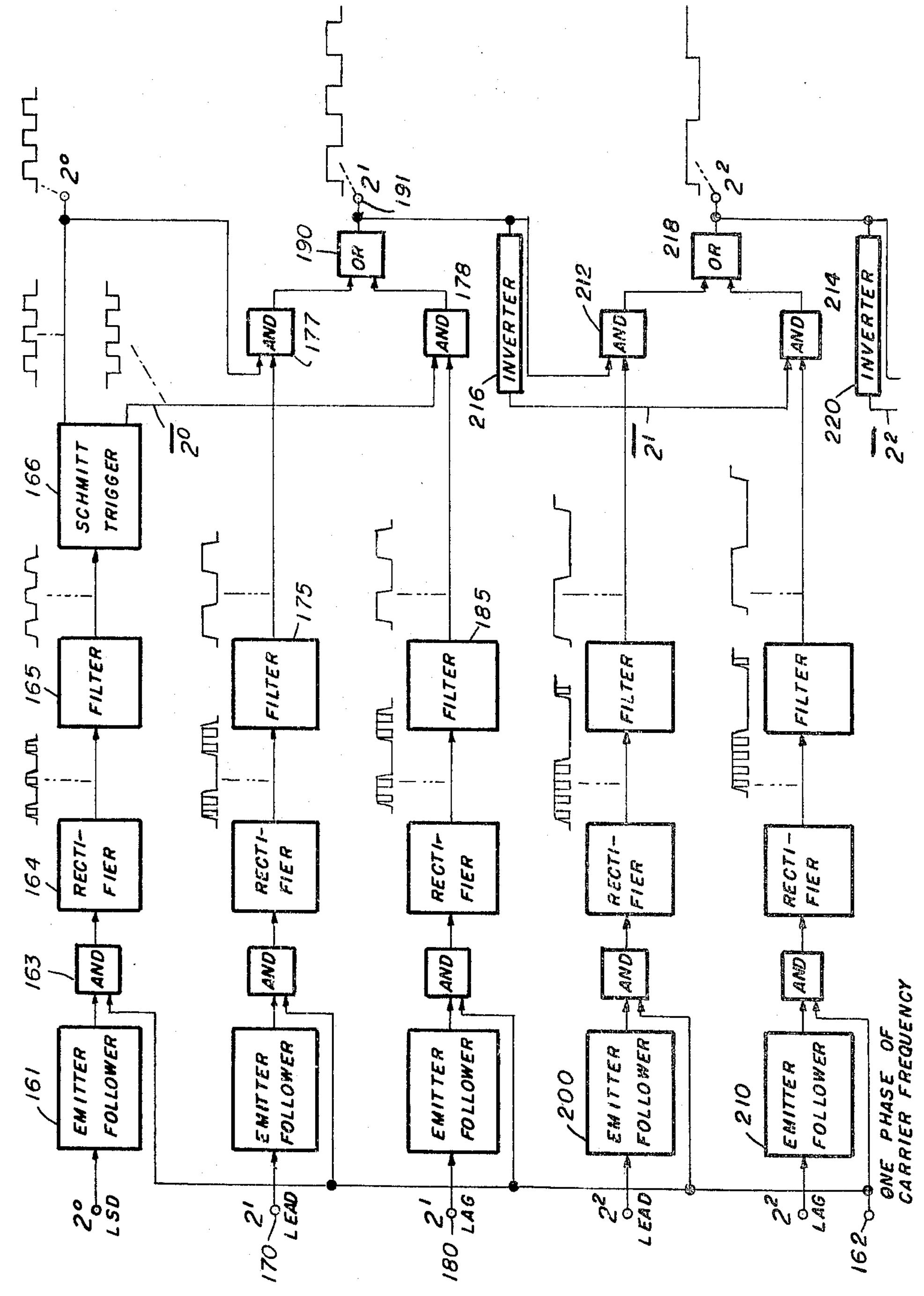
FIGURE 7 is a block diagram of electrical circuitry suitable for use with the embodiment shown in FIGURE 5 and illustrating the use of standard V scan AND/OR logic to obtain nonambiguous readout.

Logic circuitry, as shown in FIGURE 7, will decide which pickoff element of a particular track will be interrogated. For example, the single signal from the pickoff element 142 of the least significant digit 141 is introduced into an emitter follower 161 as shown in the block diagram of FIGURE 7, with the signal therefrom coupled to an AND gate 163. One phase of the carrier frequency is introduced to a terminal 162 and coupled to the AND gate 163. The signal from AND gate 163 is introduced to a rectifier 164 and the signal therefrom is coupled to a filter 165. The signal from the filter 165 is introduced into a Schmitt trigger 166 that may have two outputs, one representing the least significant digit, denoted at $2^0$, and the second representing the complement of this signal, denoted as $\overline{2^0}$. Signals from the next significant track of the code disk 100 appear on both the leading element 151 and the lagging element 152. The signal from the leading element 151 is introduced into a terminal 170 and the signal from lagging pickoff element 152 is introduced into a terminal 180. The signals appearing at these two terminals are shaped into square signals by circuitry similar to that described above in connection with the least significant digit.

A leading signal from a filter 175 is introduced into an AND gate 177 and is combined with the $2^0$ signal from the Schmitt trigger 166. A lagging signal from the filter 185 is introduced into an AND gate 178 and is combined with the $\overline{2^0}$ signal from the Schmitt trigger 166. The signals from AND gates 177 and 178 are introduced to an OR gate 190 whose output appears at a terminal 191 as the digital representation denoted $2^1$.

A leading signal $2^2$ from the next significant digit is introduced into an emitter follower 200 and a lagging signal $\overline{2^2}$ is introduced into an emitter follower 210. These leading and lagging signals are introduced into circuits similar to those described in connection with the previous digits and also into AND gates 212 and 214 respectively. The signal $2^1$ from OR gate 190 is introduced to a second input of AND gate 212 and is combined with the output from the lagging pickoff element $2^2$. Also the signal from OR gate 190 is inverted by an inverter 216, becoming the digital representation denoted $\overline{2^1}$. This signal is combined with $2^2$ lagging signal whereby the signals from the AND gates 212 and 214 are introduced to OR gate 218. The output from the OR gate 218 is the digital representation denoted $2^2$. The signal $2^2$ is used in the generation of more significant digit representations after the signal $2^2$ is inverted by the inverter 220 to produce the signal $\overline{2^2}$. All signals for the remaining tracks are processed in the same manner. The above-mentioned AND/OR logic is explained fully in the aforementioned patent to Leo P. Retzinger, Jr. It should be noted that the block diagram illustrated in FIGURE 7 is merely one way of operating a seven bit encoder employing the principles of this invention.

Turning now to an embodiment illustrated in FIGURE 8 which illustrates a code track 221 comprising segments 226 and 227 which provides both the least significant digit $2^0$ and the next significant digit $2^1$, pickoff element 222 is provided with a plurality of pairs of pickoff segments indicated as 223 and 224, which are coupled to the code track 221 by electrostatic induction. Code segments 226 are excited with frequency $\phi_1$ and code segments 227 are excited with frequency $\phi_2$. The spacing between the pickoff segments 223 and 224 is one-half the width of a single code segment of track 221 measuring from the center of segment 223 to the center of segment 224. The width of the segments 223 or 224 is one-fourth the width of the code segment, making the distance between the two pickoff segments 223 and 224 equal to one-fourth the width of the code segment. As relative movement between the pickoff element 222 and the code track 221 places both pickoff segments 223 and 224 over the same phase, as for example code segment 226, the output signal will be $\phi_1$. When further relative movement places the pickoff element 222 in a position so pickoff segment 224 is detecting $\phi_1$ and the pickoff segment 223 is detecting $\phi_2$, the two signals of opposite phase cancel and the output from the element 222 is zero. When further relative motion places both pickoff segments 223 and 224 directly over the code segment 227, the output will be $\phi_2$. Thus, the signals which are produced when there is relative movement between the code track 221 and the pickoff element 222 consist of a plurality of equally spaced, modulated envelopes with one envelope containing the carrier frequency ($\phi_1$), a zero reading for a time duration equal to the width of the envelopes and a second envelope containing frequency ($\phi_2$) as illustrated in the Graph 240.

Referring now to FIGURE 9, the signal from the pickoff element is introduced into an emitter follower 242 and continues into a rectifier 244 which removes all negative portions of the signal as shown in Graph 246. The rectified signal 246 is introduced into a filter 248 which removes all the carrier frequency regardless of phase. The signal is then introduced into a Schmitt trigger 247 that is used to increase the rise and decay time or square the signal.

Also, positioned to read its digital representation from the same particular code track of the embodiment illustrated in FIGURE 8, is a pair of leading and lagging pickoff elements, as previously described in connection with FIGURE 6, which will operate in the manner described in connection with FIGURE 7.

Another embodiment employing the present invention uses low amplitude signals to generate a binary 0 which is non-responsive to a threshold element such as a Schmitt trigger. This is accomplished, as shown in FIGURE 10, by placing the ground tap on transformer 17 at a position such that $\phi_1$ on the conductor 19 appears at a lower amplitude than $\phi_2$ on conductor 18. The signal is shown in Graph 250, FIGURE 9. The Schmitt trigger has a threshold level substantially above the amplitude of $\phi_1$ as shown by the line 251, FIGURE 10. Thus all signals that pass the threshold level indicate a binary 1 and those signals below the threshold level indicate a binary 0. An advantage of this is the elimination of the necessary AND gate normally used to AND $\phi_1$ and $\phi_2$ and also eliminate the filter. FIGURE 11 illustrates one example of the circuitry that is needed for the embodiment depicted in FIGURE 9. The signal is introduced into an emitter follower 260 and fed into a Schmitt trigger 262, which may have two outputs to provide the signal or complement of the signal generated. The Schmitt trigger 262 is responsive to all positive signals above the threshold level line 251 regardless of frequencies.

It should be understood, of course, that the foregoing disclosure relates only to preferred embodiments of the invention and that numerous modifications and substitutions may be made therein without departing from the spirit and scope of this invention as set forth in the appending claims.

What is claimed is:

1. An analog-to-digital encoder comprising:

(A) an information code disk adapted to receive analog quantities in the form of angular position, having a pair of conductive patterns arranged in a plurality of concentric code tracks, each said code track comprising a plurality of segments, and each said segment insulated from adjacent segments and alternately forming a portion of one of said pair of conductive patterns, (B) A.C. generating means electrically coupled to said pair of said conductive patterns and adapted to provide an electrical signal to each said pattern at frequencies of different phases providing a varying electrostatic field surrounding said adjacent segments to each said concentric track, said field having a fixed zero potential at a line between said adjacent segments, (C) a pickoff disk movable with respect to said information code disk comprising a plurality of concentric pickoff tracks, each said track comprising a plurality of pickoff segments, said pickoff segments spaced at a particular distance to insure that all segments are electrostatically coupled to segments of one particular phase for receiving electrical signals indicative of a particular phase to represent a binary 0 and a different phase for a binary 1.

2. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means adapted to apply a signal at a particular frequency to one of said pair of coded patterns and a signal at a frequency 180 degrees phase difference from said particular frequency to the other said coded pattern, (C) an electrically conductive pickoff member movable with respect to said information code disk and comprising a pickoff track, each said pickoff track coupled to one of said coded track by electrostatic induction for providing electrical signals indicative of the position of said pickoff member with respect to said information member.

3. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means electrically coupled to the pair of said conductive patterns and adapted to provide an electrical signal to each said pattern at frequencies of different phases providing a varying electrostatic field surrounding said adjacent segments to each said concentric track, said field having a fixed zero potential at a line between said adjacent segments, and (C) a pickoff disk movable with respect to said information code disk comprising a plurality of concentric pickoff tracks, each said track comprising a plurality of pickoff segments, said pickoff segments spaced at a particular distance to insure that all pickoff segments are electrostatically coupled to code segments of one particular phase for receiving electrical signals indicative of a particular phase to represent a binary 0 and a different phase for a binary 1.

4. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means adapted to apply a signal at a particular frequency to first electrically conductive pattern and a signal at a frequency 180 degrees phase difference from said particular frequency to second electrically conductive pattern, (C) an electrically conductive pickoff member movable with respect to said information code member and comprising a pickoff track coupled to each said coded track by electrostatic induction for providing electrical signals indicative of the position of said pickoff member with respect to said information member, (D) phase sensitive circuitry connected to said pickoff member and adapted to receive said A.C. signals for providing a pair of electrical signals indicative of a binary 1 and a binary 0.

5. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means electrically coupled to said pair of conductive patterns for providing a varying electrostatic field surrounding said pattern, said field having a fixed zero potential level at a line between adjacent segments, and (C) an electrically conductive pickoff member, movable with respect to said information code member and comprising a plurality of pickoff tracks, each said pickoff track coupled to one of said coded tracks by electrostatic induction for producing electrical signals indicative of the position of said pickoff member with respect to said information member, (D) phase sensitive circuitry connected to said pickoff member and adapted to receive said A.C. signals for providing a pair of electrical signals indicative of a binary 1 and a binary 0.

6. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means electrically coupled to said pair of conductive patterns and adapted to provide a signal of a particular frequency to one of said patterns and a signal at a frequency 180 degrees phase difference from said particular frequency to the other said pattern, (C) an electrically conductive pickoff member movable with respect to said information code member and comprising a plurality of electrically conductive pickoff tracks, each said pickoff track coupled to one said code track by electrostatic induction for providing electrical signals indicative of the position of said pickoff member with respect to said information member, (D) phase sensitive circuitry connected to said pickoff member and adapted to receive said A.C. signals for providing a pair of electrical signals indicative of a binary 1 and a binary 0.

7. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means electrically coupled to the pair of said conductive patterns and adapted to provide an electrical signal to each said pattern at frequencies of different phases providing a varying electrostatic field surrounding said adjacent segments to each said concentric track, said field having a fixed zero potential at a line between said adjacent segments, (C) a pickoff disk movable with respect to said information code disks comprising a plurality of concentric pickoff tracks, each said track comprising a plurality of pickoff segments, said pickoff segments spaced at a particular distance to insure that all segments are electrostatically coupled to segments of one particular phase for receiving electrical signals indicative of a particular phase to represent a binary 0 and a different phase for a binary 1, (D) phase sensitive circuitry connected to said pickoff disk and adapted to receive said A.C. signals for providing a pair of electrical signals indicative of a binary 1 and a binary 0.

8. An analog-to-digital encoder comprising:

(A) an information member having a pair of electrically conductive patterns arranged in a plurality of code tracks, each said track comprising a plurality of conductive code segments, and each said code segment insulated from adjacent code segments and each forming a portion of one of said pairs of conductive patterns, (B) A.C. generating means electrically coupled to said pair of conductive patterns for providing a varying electrostatic field surrounding said pattern, said field having a fixed zero potential level at a line between adjacent segments, and (C) an electrically conductive pickoff member, movable with respect to said information code member and comprising a plurality of pickoff tracks, each said pickoff track coupled to one of said coded tracks by electrostatic induction for producing electrical signals, and (D) phase sensitive circuitry connected to each said pickoff track and adapted to transform said electrical signal to a digital representation indicative of the position of said pickoff member with respect to said information member comprising an AND gate adapted to AND the electrical signals from said pickoff track with the signal produced from said A.C. generating means, a rectifying means adapted to receive and rectify the output signals from said AND gate, a low pass filter adapted to receive the output signal from said rectifier and filter out all signals of the same frequency as said A.C. generating means and passing all signals generated by said electrostatic field, and signal squaring means adapted to receive the output signal from said low pass filter and providing an output signal resultant in digital representation of the angular position of said information member.

9. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means adapted to apply a signal at a particular frequency to first electrically conductive pattern and a signal at a frequency 180 degrees phase difference from said particular frequency to second electrically conductive pattern, (C) an electrically conductive pickoff member movable with respect to said information code member and comprising a pickoff track coupled to each said coded track by electrostatic induction for providing electrical signals indicative of the position of said pickoff member with respect to said information member, and (D) phase sensitive circuitry provided for each said pickoff track and adapted to transform said electrical signals to a digital representation indicative of the position of said pickoff member with respect to said information member comprising: an AND gate adapted to combine said electrical signal with said signals of a particular phase from said A.C. generating means, rectifying means adapted to receive and rectify the output signal from said AND gate, a low pass filter adapted to receive the output signal from said rectifier and eliminate all signals with the same frequency as said A.C. generating means while passing all signals generated by said electrostatic field, signal squaring means adapted to receive the output signal from said low pass filter providing a digital representation of the angular position of said information member.

10. An analog-to-digital encoder comprising:

(A) an information member having a pair of electrically conductive code patterns arranged in a plurality of coded tracks, each said track comprising a plurality of conductive code segments and each said code segment insulated from adjacent code segments and each forming a portion of one of said conductive patterns, (B) A.C. generating means electrically coupled to said pair of conductive patterns and adapted to provide a signal of a particular frequency to one of said patterns and a signal at a frequency 180 degrees phase difference from said particular frequency to the other said pattern, (C) a pickoff disk movable with respect to said information code disk comprising a plurality of concentric pickoff tracks, each said track comprising a plurality of pickoff segments, said pickoff segments spaced at a particular distance to insure that all segments are electrostatically coupled to segments of one particular phase for receiving electrical signals indicative of a particular phase to represent a binary 0 and a different phase for a binary 1, and (D) phase sensitive circuitry provided for each said pickoff track and adapted to transform said electrical signals to a digital representation indicative of the position of said pickoff member with respect to said information member comprising: an AND gate adapted to combine said electrical signal with said signals of a particular phase from said A.C. generating means, rectifying means adapted to receive and rectify the output signal from said AND gate, a low pass filter adapted to receive the output signal from said rectifier and eliminate all signals with the same frequency as said A.C. generating means while passing all signals generated by said electrostatic field, signal squaring means adapted to receive the output signal from said low pass filter providing a digital representation of the angular position of said information member.

11. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means electrically coupled to said pair of conductive patterns for providing a varying electrostatic field surrounding said pattern, said field having a fixed zero potential level at a line between adjacent segments, (C) a pickoff disk movable with respect to said information code disk comprising a plurality of concentric pickoff tracks, each said track comprising a plurality of pickoff segments, said pickoff segments spaced at a particular distance to insure that all segments are electrostatically coupled to segments of one particular phase for receiving electrical signals indicative of a particular phase to represent a binary 0 and a different phase for a binary 1, and (D) phase sensitive circuitry provided for each said pickoff track and adapted to transform said electrical signals to a digital representation indicative of the position of said pickoff member with respect to said information member comprising: an AND gate adapted to combine said electrical signal with said signal of a particular phase from said A.C. generating means, rectifying means adapted to receive and rectify the output signal from said AND gate, a low pass filter adapted to receive the output signal from said rectifier and eliminate all signals with the same frequency as said A.C. generating means while passing all signals generated by said electrostatic field, signal squaring means adapted to receive the output signal from said low pass filter providing a digital representation of the angular position of said information member.

12. An analog-to-digital encoder comprising:

(A) an information member having two conductive segments insulated from each other, (B) A.C. generating means electrically coupled to said segments and adapted to provide a voltage to one segment at a particular amplitude and a voltage to the other segment at an amplitude lower than said particular amplitude and providing a varying electrostatic field surrounding said segments, said field having a fixed zero potential level at a line between said segments, (C) an electrically conductive pickoff element movable with respect to said information member and coupled to said segments by electrostatic induction for producing electrical signals indicative of a position of the pickoff element to said information member.

13. An analog-to-digital encoder comprising:

(A) an information code disk adapted to receive analog quantities in the form of angular positions having a pair of conductive patterns arranged in a plurality of concentric tracks, each said track consisting of a plurality of conductive segments, and each said segment insulated from adjacent segment and alternately forming a portion of one of said conductive patterns, (B) A.C. generating means electrically coupled to said conductive patterns and adapted to provide a first voltage to one of said code patterns at a particular amplitude and a particular frequency and a second voltage to the other said code pattern at a lower amplitude and a frequency 180 degrees phase difference from said particular frequency of said first voltage, said generating means providing a varying electrostatic field surrounding said adjacent segments in each said concentric track, (C) a pickoff disk, movable with respect to said information code disk comprising a plurality of concentric pickoff tracks, each said pickoff track coupled to one of said plurality of said code tracks by electrostatic induction for producing a binary coded electrical signal indicative of the angular position of said code disk.

14. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means electrically coupled to said conductive segments and adapted to provide a first voltage to one of said code patterns at a particular amplitude and a particular frequency and a second voltage to the other said code pattern at a lower amplitude and a frequency 180 degrees phase difference from said particular frequency of said first voltage, said generating means providing a varying electrostatic field surrounding said adjacent segments in each said concentric track, (C) a pickoff disk, movable with respect to said information code disk comprising a plurality of concentric pickoff tracks, each said pickoff track coupled to one of said plurality of said code tracks by electrostatic induction for producing a binary coded electrical signal indicative of the angular position of said code disk.

15. An analog-to-digital encoder comprising:

(A) an information member having two conductive segments insulated from each other, (B) A.C. generating means electrically coupled to said segments and adapted to provide a voltage to one segment of a particular amplitude and a voltage to the other segment of an amplitude lower than said particular amplitude and providing a varying electrostatic field surrounding said segments, said field having a fixed zero potential level at a line between said segments, (C) an electrically conductive pickoff element movable with respect to said information member and coupled to said segments by electrostatic induction for producing electrical signals indicative of a position of the pickoff element to said information member, (D) a threshold gate adapted to receiving said electrical signals from said pickoff element and having a threshold level above the said voltage of the lower amplitude.

16. An analog-to-digital encoder comprising:

(A) an information code disk adapted to receive analog quantities in the form of angular positions having a pair of conductive patterns arranged in a plurality of concentric tracks, each said track comprising a plurality of conductive segments, and each said segment insulated from adjacent segment and alternately forming a portion of one of said conductive patterns, (B) A.C. generating means electrically coupled to said conductive segments and adapted to provide a first voltage to one of said code patterns of a particular amplitude and a particular frequency and a second voltage to the other said code pattern of a lower amplitude and a frequency 180 degrees phase difference from said particular frequency of said first voltage, said generating means providing a varying electrostatic field surrounding said adjacent segments in each said concentric track, (C) a pickoff disk, movable with respect to said information code disk comprising a plurality of concentric pickoff tracks, each said pickoff track coupled to one of said plurality of said code tracks by electrostatic induction for producing a binary coded electrical signal indicative of the angular position of said code disk, (D) a threshold circuit adapted to receive electrical signals from said pickoff track and having a threshold level above the said voltage of the lower amplitude.

17. An analog-to-digital encoder comprising:

(A) an information code disk comprising a pair of binary coded patterns arranged in a plurality of concentric code tracks, each said code track representing a binary digit and comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit comprising code segments of a particular concentric length, each track adapted to represent digits of more significance by having code segments twice the concentric length of the code segments of the next lower digit, (B) A.C. generating means electrically coupled to said conductive segments and adapted to provide a first voltage to one of said code patterns at a particular amplitude and a particular frequency and a second voltage to the other said code pattern of a lower amplitude and a frequency 180 degrees phase difference from said particular frequency of said first voltage, said generating means providing a varying electrostatic field surrounding said adjacent segments in each said concentric track, (C) a pickoff disk, movable with respect to said information code disk comprising a plurality of concentric pickoff tracks, each said pickoff track coupled to one of said plurality of said code tracks by electrostatic induction for producing a binary coded electrical signal indicative of the angular position of said code disk, (D) a threshold circuit adapted to receive electrical signals from said pickoff track and having a threshold level above the said voltage of the lower amplitude.

18. An analog-to-digital encoder comprising:

(A) an information member having a pair of electrically conductive code patterns comprising a plurality of conductive code segments and each said code segment insulated from adjacent code segments and each forming a portion of one of said conductive patterns, (B) A.C. generating means electrically coupled to said pair of conductive patterns and adapted to provide signals of a particular frequency to one of said patterns and a signal at a frequency 180 degrees phase difference from said particular frequency to the other said pattern, (C) electrically conductive pickoff member movable with respect to said information member and comprising a pair of pickoff tracks coupled to said code pattern by electrostatic induction, one said pickoff track comprising a plurality of pickoff segments arranged in pairs, said pickoff segments having a physical length of substantially one-fourth the length of one of said code segments and said individual pickoff segments of said pair of pickoff segments spaced apart by substantially one-fourth the physical length of one of said code segments, each said pair of pickoff segments spaced from adjacent pair of pickoff segments at a particular distance to insure that all pickoff segments are coupled to code segments of the same phase and adapted to provide binary digits of one particular segment, the other of said pair of pickoff tracks comprising a plurality of pickoff segments, each said segment spaced from adjacent segments at a particular distance to insure that all pickoff segments of said other of said pair of pickoff tracks are coupled to segments of the same phase and adapted to provide binary digits of a next higher significance than than said particular significance.

19. An analog-to-digital encoder comprising:

(A) an information code disk adapted to receive analog quantities in the form of angular positions, said disk having a pair of electrically conductive patterns arranged in a plurality of concentric tracks, each said track comprising a plurality of conductive segments and each said segment insulated from adjacent segments and alternately forming a portion of one of said conductive patterns, (B) A.C. generating means electrically coupled to said conductive patterns and adapted to provide a signal to one of said code patterns at a particular frequency and a signal to the other said code pattern at a frequency 180 degrees phase difference from said particular frequency, said generating means providing a varying electrostatic field surrounding said adjacent segments in each said concentric track, (C) an electrically conductive pickoff disk movable with respect to said information disk and comprising a pair of pickoff tracks coupled to a particular concentric code track by electrostatic induction, one said pickoff track comprising a plurality of pickoff segments arranged in pairs, each pickoff segment having a concentric length of substantially one-fourth of the concentric length of a particular code segment of said particular code track and said individual segments of said pair of segments spaced apart by substantially one-fourth of the concentric length of one of said particular code segments, each said pair of pickoff segments spaced from adjacent pair of pickoff segments to insure that all pickoff tracks are coupled to said code segments of the same phase and adapted to provide binary digits of one particular significance, the other of said pair of concentric pickoff tracks comprising a plurality of pickoff segments, each of said segments spaced from adjacent segments at a particular distance to insure that all pickoff segments of the other said pickoff track are coupled to segments of the same phase and adapted to provide binary digits of the next higher significance than said particular significance.

20. An analog-to-digital encoder comprising:

(A) an information code disk comprising a pair of binary coded patterns arranged in a plurality of concentric code tracks, each said code track representing a binary digit comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant digit and comprising code segments of a particular concentric length, each track adapted to represent digits of more significance by having code segments twice the concentric length of the code segments of the next lower digit, (B) A.C. generating means adapted to apply a signal at a particular frequency to one said pair of coded patterns and a signal at a frequency 180 degrees phase difference from said particular frequency to the other of said coded pattern, (C) an electrically conductive pickoff disk movable with respect to said information disk and comprising a pair of pickoff tracks coupled to a particular concentric code track by electrostatic induction, one said pickoff track comprising a plurality of pickoff segments arranged in pairs, each pickoff segment having a concentric length of substantially one-fourth of the concentric length of a particular code segment of said particular code track and said individual segments of said pair of segments spaced apart by substantially one-fourth of the concentric length of one of said particular code segments, each said pair of pickoff segments spaced from adjacent pair of pickoff segments to insure that all pickoff tracks are coupled to said code segments of the same phase and adapted to provide binary digits of one particular significance, the other of said pair of concentric pickoff tracks comprising a plurality of pickoff segments, each of said segments spaced from adjacent segments at a particular distance to insure that all pickoff segments of the other said pickoff track are coupled to segments of the same phase and adapted to provide binary digits of the next higher significance than said particular significance.

21. An analog-to-digital encoder comprising:

(A) an information member having a pair of electrically conductive code patterns comprising a plurality of conductive code segments and each said code segment insulated from adjacent code segments and each forming a portion of one of said conductive patterns, (B) A.C. generating means electrically coupled to said pair of conductive patterns and adapted to provide signals of a particular frequency to one of said patterns and a signal at a frequency 180 degrees phase difference from said particular frequency to the other said pattern, (C) an electrically conductive pickoff disk movable with respect to said information disk and comprising a pair of pickoff tracks coupled to a particular concentric code track by electrostatic induction, one said pickoff track comprising a plurality of pickoff segments arranged in pairs, each pickoff segment having a concentric length of substantially one-fourth of the concentric length of a particular code segment of said particular code track and said individual segments of said pair of segments spaced apart by substantially one-fourth of the concentric length of one of said particular code segments, each said pair of pickoff segments spaced from adjacent pair of pickoff segments to insure that all pickoff tracks are coupled to said code segments of the same phase and adapted to provide binary digits of one particular significance, the other of said pair of concentric pickoff tracks comprising a plurality of pickoff segments, each of said segments spaced from adjacent segments at a particular distance to insure that all pickoff segments of the other said pickoff track are coupled to segments of the same phase and adapted to provide binary digits of the next higher significance than said particular significance, (D) phase sensitive circuitry connected to said pickoff member and adapted to receive said A.C. signals for providing a pair of electrical signals indicative of a binary 1 and a binary 0.

22. An analog-to-digital encoder comprising:

(A) an information code disk adapted to receive analog quantities in the form of angular positions, said disk having a pair of electrically conductive patterns arranged in a plurality of concentric tracks, each said track comprising a plurality of conductive segments and each said segment insulated from adjacent segments and alternately forming a portion of one of said conductive patterns, (B) A.C. generating means electrically coupled to said conductive patterns and adapted to provide a signal to one of said code patterns at a particular frequency and a signal to the other said code pattern at a frequency 180 degrees phase difference from said particular frequency, said generating means providing a varying electrostatic field surrounding said adjacent segments in each said concentric track, (C) an electrically conductive pickoff disk movable with respect to said information disk and comprising a pair of pickoff tracks coupled to a particular concentric code track by electrostatic induction, one said pickoff track comprising a plurality of pickoff segments arranged in pairs, each pickoff segment having a concentric length of substantially one-fourth of the concentric length of a particular code segment of said particular code track and said individual segments of said pair of segments spaced apart by substantially one-fourth of the concentric length of one of said particular code segments, each said pair of pickoff segments spaced from adjacent pair of pickoff segments to insure that all pickoff tracks are coupled to said code segments of the same phase and adapted to provide binary digits of one particular significance, the other of said pair of concentric pickoff tracks comprising a plurality of pickoff segments, each of said segments spaced from adjacent segments at a particular distance to insure that all pickoff segments of the other said pickoff track are coupled to segments of the same phase and adapted to provide binary digits of the next higher significance than said particular significance, (D) phase sensitive circuitry connected to said pickoff member and adapted to receive said A.C. signals for providing a pair of electrical signals indicative of a binary 1 and a binary 0.

23. An analog-to-digital encoder comprising:

(A) an information code disk comprising a pair of binary coded patterns arranged in a plurality of concentric code tracks, each said code track representing a binary digit comprising a plurality of electrically conductive code segments, each said code segment in each said track insulated from adjacent code segments in their respective tracks and each alternate segment forming a portion of one of said pair of coded patterns and the remaining segments forming a portion of the other coded pattern, one said code track adapted to represent a least significant code track adapted to represent a leastt significatn digit and comprising code segments of a particular concentric length, each track adapted to represent digits of more significance by having code segments twice the concentric length of the code segments of the next lower digit, (B) A.C. generating means adapted to apply a signal at a particular frequency to one said pair of coded patterns and a signal at a frequency 180 degrees phase difference from said particular frequency to the other of said coded pattern, (C) an electrically conductive pickoff disk movable with respect to said information disk and comprising a pair of pickoff tracks coupled by electrostatic induction to said code track representing the least significant digit, each said remaining tracks of a particular digit of higher significance having a pickoff track coupled thereto by electrostatic induction, one of said pickoff tracks representing the least significant code tracks comprises a plurality of pickoff segments arranged in pairs, said pickoff segments of said pairs of pickoff segments having a physical length of substantially one-fourth the concentric length of one of said code segments and each length of one of said code segments and each individual segment of said pair of segments spaced apart by substantially one-fourth the concentric length of said code segments of the least significant track, each said pair of pickoff segments spaced from adjacent pair of pickoff segments to insure that all pairs of pickoff segments are coupled to code segments of the same phase and adapted to provide a binary digit of the least significance, the other said pickoff track coupled to said least significant digit track comprising a plurality of pickoff segments, each of said segments spaced from adjacent segments at a particular distance to insure that all pickoff segments of other said pickoff tracks in the least significant digit are coupled to the segments of the same phase and adapted to provide binary digits of the next significant digit.

(D) phase sensitive circuitry connected to said pickoff member and adapted to receive said A.C. signals for providing a pair of electrical signals indicative of a binary 1 and a binary 0.

References Cited by the Examiner

UNITED STATES PATENTS

| | | | |
|---|---|---|---|
| 2,674,729 | 4/1954 | Carter | 323—93 |
| 2,925,590 | 2/1960 | Boltinghouse et al. | 340—200 |
| 3,121,839 | 2/1964 | Malenich | 340—200 |
| 3,142,795 | 7/1964 | Greeley | 323—93 |
| 3,146,394 | 8/1964 | Frisch | 340—347 |
| 3,156,911 | 11/1964 | Ziserman | 340—347 |

MAYNARD R. WILBUR, *Primary Examiner.*

DARYL W. COOK, *Examiner.*

K. R. STEVENS, *Assistant Examiner.*